United States Patent
Hoshuyama

(10) Patent No.: US 7,474,339 B2
(45) Date of Patent: Jan. 6, 2009

(54) IMAGE-PROCESSING DEVICE WITH A FIRST IMAGE SENSOR AND A SECOND IMAGE SENSOR

(75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 569 days.

(21) Appl. No.: 10/732,299

(22) Filed: Dec. 11, 2003

(65) Prior Publication Data

US 2004/0233295 A1 Nov. 25, 2004

(30) Foreign Application Priority Data

Dec. 18, 2002 (JP) ............................. 2002-366298
Dec. 5, 2003 (JP) ............................. 2003-407514

(51) Int. Cl.
*H04N 9/73* (2006.01)
*H04N 5/225* (2006.01)
*G06K 9/00* (2006.01)

(52) U.S. Cl. .................. 348/223.1; 348/262; 382/167
(58) Field of Classification Search ................ 348/265, 348/236, 262, 223.1; 382/167
See application file for complete search history.

(56) References Cited

U.S. PATENT DOCUMENTS 5,045,928 A * 9/1991 Takaiwa et al. .......... 348/227.1
5,434,645 A * 7/1995 Usami ......................... 355/38
2002/0085100 A1 * 7/2002 Takahashi .................. 348/223

FOREIGN PATENT DOCUMENTS

JP A 2001-203903 7/2001
JP A 2002-010095 1/2002

* cited by examiner

*Primary Examiner*—David L Ometz
*Assistant Examiner*—Wanda M Negron
(74) *Attorney, Agent, or Firm*—Oliff & Berridge, PLC

(57) ABSTRACT

A first image sensor receiving light from a subject and a second image sensor capable of receiving light of the same image as the first image sensor and having a spectral sensitivity characteristic different from that of the first image sensor are provided. A color-correcting coefficient determining part calculates, based on each output value photoelectrically converted in the first and the second image sensors, a color-correcting coefficient with which a color-correcting part performs color correction on the output value of the first image sensor. Using the first and the second image sensors of different spectral sensitivity characteristics, parameters for receiving/recognizing light from a subject field can be easily increased to obtain a favorable color reproduction characteristic. Since applying the image-processing device to a conventional electronic camera including the first and second image sensors only requires a change in signal-processing method, it can be easily applied to an existing electronic camera.

10 Claims, 11 Drawing Sheets

| RGs' | BGs' | RGm' | BGm' | coefficient number |
|---|---|---|---|---|
| 0 | 0 | 0 | 0 | 0 |
| 0 | 0 | 0 | 1 | 0 |
| 0 | 0 | 0 | 2 | 0 |
| 0 | 0 | 0 | 3 | 0 |
| 0 | 0 | 0 | 4 | 2 |
| 0 | 0 | 0 | 5 | 2 |
| 0 | 0 | 0 | 6 | 3 |
| 0 | 0 | 0 | 7 | 4 |
| 0 | 0 | 0 | 8 | 5 |
| 0 | 0 | 0 | 9 | 5 |
| 0 | 0 | 1 | 0 | 5 |
| 0 | 0 | 1 | 1 | 5 |
| 0 | 0 | 1 | 2 | 2 |
| 0 | 0 | 1 | 3 | 2 |
| 0 | 0 | 1 | 4 | 2 |
| 0 | 0 | 1 | 5 | 2 |
| 0 | 0 | 1 | 6 | 2 |
| 0 | 0 | 1 | 7 | 2 |
| 0 | 0 | 1 | 8 | 2 |
| 0 | 0 | 1 | 9 | 2 |
| ~ | ~ | ~ | ~ | ~ |
| 9 | 9 | 9 | 7 | 23 |
| 9 | 9 | 9 | 8 | 23 |
| 9 | 9 | 9 | 9 | 22 |

Fig. 5

| coefficient number | CC0 | CC1 | CC2 | CC3 | CC4 | CC5 | CC6 | CC7 | CC8 |
|---|---|---|---|---|---|---|---|---|---|
| 0 | 1.000 | -0.297 | 0.297 | -0.297 | 1.319 | -0.022 | -0.260 | 0.273 | 0.987 |
| 1 | 1.000 | -0.297 | 0.297 | -0.297 | 1.319 | -0.022 | -0.260 | 0.273 | 0.987 |
| 2 | 1.000 | -0.261 | 0.261 | -0.242 | 1.266 | -0.024 | -0.213 | 0.240 | 0.972 |
| 3 | 1.000 | -0.190 | 0.190 | -0.133 | 1.160 | -0.027 | -0.118 | 0.175 | 0.943 |
| 4 | 1.000 | -0.137 | 0.137 | -0.051 | 1.080 | -0.030 | -0.047 | 0.125 | 0.921 |
| 5 | 1.065 | -0.158 | 0.093 | -0.016 | 1.040 | -0.024 | -0.024 | 0.103 | 0.921 |
| 6 | 1.130 | -0.179 | 0.049 | 0.019 | 1.000 | -0.019 | -0.001 | 0.080 | 0.921 |
| 7 | 1.024 | -0.021 | -0.004 | 0.077 | 1.009 | -0.086 | 0.038 | -0.261 | 1.223 |
| 8 | 1.101 | -0.080 | -0.004 | 0.077 | 1.077 | -0.131 | 0.038 | -0.251 | 1.228 |
| 9 | 1.178 | -0.140 | 0.005 | 0.073 | 1.146 | -0.176 | 0.030 | -0.241 | 1.233 |
| 10 | 1.254 | -0.199 | 0.024 | 0.064 | 1.215 | -0.221 | 0.013 | -0.231 | 1.237 |
| 11 | 1.331 | -0.259 | 0.037 | 0.058 | 1.284 | -0.266 | 0.001 | -0.222 | 1.242 |
| 12 | 1.407 | -0.318 | -0.034 | -0.004 | 1.353 | -0.311 | -0.024 | -0.212 | 1.247 |
| 13 | 1.484 | -0.378 | -0.106 | -0.066 | 1.422 | -0.356 | -0.050 | -0.202 | 1.252 |
| 14 | 1.000 | 0.027 | -0.027 | -0.053 | 1.168 | -0.115 | 0.054 | -0.214 | 1.160 |
| ≀ | ≀ | ≀ | ≀ | ≀ | ≀ | ≀ | ≀ | ≀ | ≀ |
| 60 | 1.059 | -0.060 | 0.000 | -0.020 | 1.131 | -0.111 | 0.039 | -0.187 | 1.148 |

Fig. 6

IMAGE-PROCESSING DEVICE WITH A FIRST IMAGE SENSOR AND A SECOND IMAGE SENSOR

This application is based upon the claims the benefit of priority from the prior Japanese Patent Application Nos. 2002-366298 and 2003-407514, each filed on Dec. 18, 2002 and Dec. 5, 2003, the entire contents of which are incorporated herein by reference.

BACKGROUND OF THE INVENTION

1. Field of the Invention

The present invention relates to an image-processing device of a digital camera, a digital video camera, and the like.

2. Description of the Related Art

Conventionally, an image-processing device receives light of three primary colors R, G, and B and then photoelectrically converts the received light to perform color correction, thereby obtaining a desired color reproduction characteristic.

In order to obtain a good color reproduction characteristic, such an image-processing device performs matrix transformation or look-up table (hereinafter, abbreviated as LUT) transformation for color correction (see Japanese Unexamined Patent Application Publication Nos. 2001-203903 and 2002-10095).

In the above-described image-processing devices, however, there arises a problem due to a difference in spectral sensitivity characteristic between the image sensor and the human eye that, for example, a certain color is recognized by the human eye but not by an image sensor.

SUMMARY OF THE INVENTION

It is an object of the present invention to provide an image-processing device that allows a favorable color reproduction characteristic to be obtained.

According to one aspect of the present invention, a first image sensor which receives light from a subject and a second image sensor capable of receiving light of the same image as the first image sensor and having a spectral sensitivity characteristic different from that of the first image sensor are provided in the image-processing device. A color-correcting coefficient is calculated by a color-correcting coefficient determining part based on each output value obtained by photoelectrical conversion in the first image sensor and the second image sensor. By using the calculated color-correcting coefficient, a color-correcting part performs color correction on the output value of the first image sensor. By using the first and the second image sensors each having a different spectral sensitivity characteristic in this manner, parameters for receiving and recognizing the light from a subject field can be easily increased to obtain a favorable color reproduction characteristic. In the case where the image-processing device is applied to a conventional electronic camera including the first and the second image sensors, only a change in the signal-processing method is required. Therefore, the present invention can be easily applied to an existing electronic camera.

According to another aspect of the invention, the first image sensor is divided into a plurality of small areas, and the second image sensor is divided into a plurality of small areas so as to correspond to the plurality of small areas of the first image sensor. Then, the output value of each pixel of the first image sensor and the second image sensor is integrated for each of the small areas so as to calculate the color-correcting coefficient by using the integrated value. By dividing the second image sensor into the plurality of small areas so as to correspond to the plurality of small areas of the first image sensor in this manner, it is ensured that a favorable color reproduction characteristic can be easily obtained even when the first image sensor and the second image sensor have a different number of pixels.

According to a further aspect of the present invention, the first image sensor and the second image sensor use a different number of pixels to receive the light from the same subject. Therefore, the present invention is applicable regardless of the number of pixels of the first image sensor and the second image sensor.

According to a further aspect of the present invention, the second image sensor is used as a colorimetric sensor which measures color balance of the subject. The exposure of the camera is controlled by an output signal from the colorimetric sensor.

According to a further aspect of the present invention, the second image sensor is used as a photometric sensor which measures luminance of the subject. The exposure of the camera is controlled by an output signal from the photometric sensor.

According to a further aspect of the present invention, a first image sensor which receives light from a subject and a second image sensor capable of receiving light of the same image as the first image sensor and having a spectral sensitivity characteristic different from that of the first image sensor are provided in the image-processing device. A color-correcting coefficient is calculated by a color-correcting coefficient determining part based on each output value obtained by photoelectrical conversion in the first image sensor and the second image sensor. By using the calculated color-correcting coefficient, a color-correcting part performs color correction on a synthesized output value of the first image sensor and the second image sensor. By using the first and the second image sensors each having a different spectral sensitivity characteristic in this manner, parameters for receiving and recognizing the light from a subject field can be easily increased to obtain a favorable color reproduction characteristic. In the case where the image-processing device is applied to a conventional electronic camera including the first and the second image sensors, only a change in the signal-processing method is required. Therefore, the present invention can be easily applied to an existing electronic camera. Moreover, color correction is performed on the synthesized output value of the first image sensor and the second image sensor by the color-correcting part. As a result, a signal of an image closer to that perceived by the human eye can be multiplied by the color-correcting coefficient.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 5 is an explanatory diagram showing an LUT in the embodiments of the image-processing device of the present invention;

FIG. 6 is an explanatory diagram showing a color-correcting coefficient selecting table in the embodiments of the image-processing device of the present invention;

DESCRIPTION OF THE PREFERRED EMBODIMENTS

Hereinafter, preferred embodiments of the present invention will be described in detail with reference to the accompanying drawings.

First Embodiment

Figure 1:
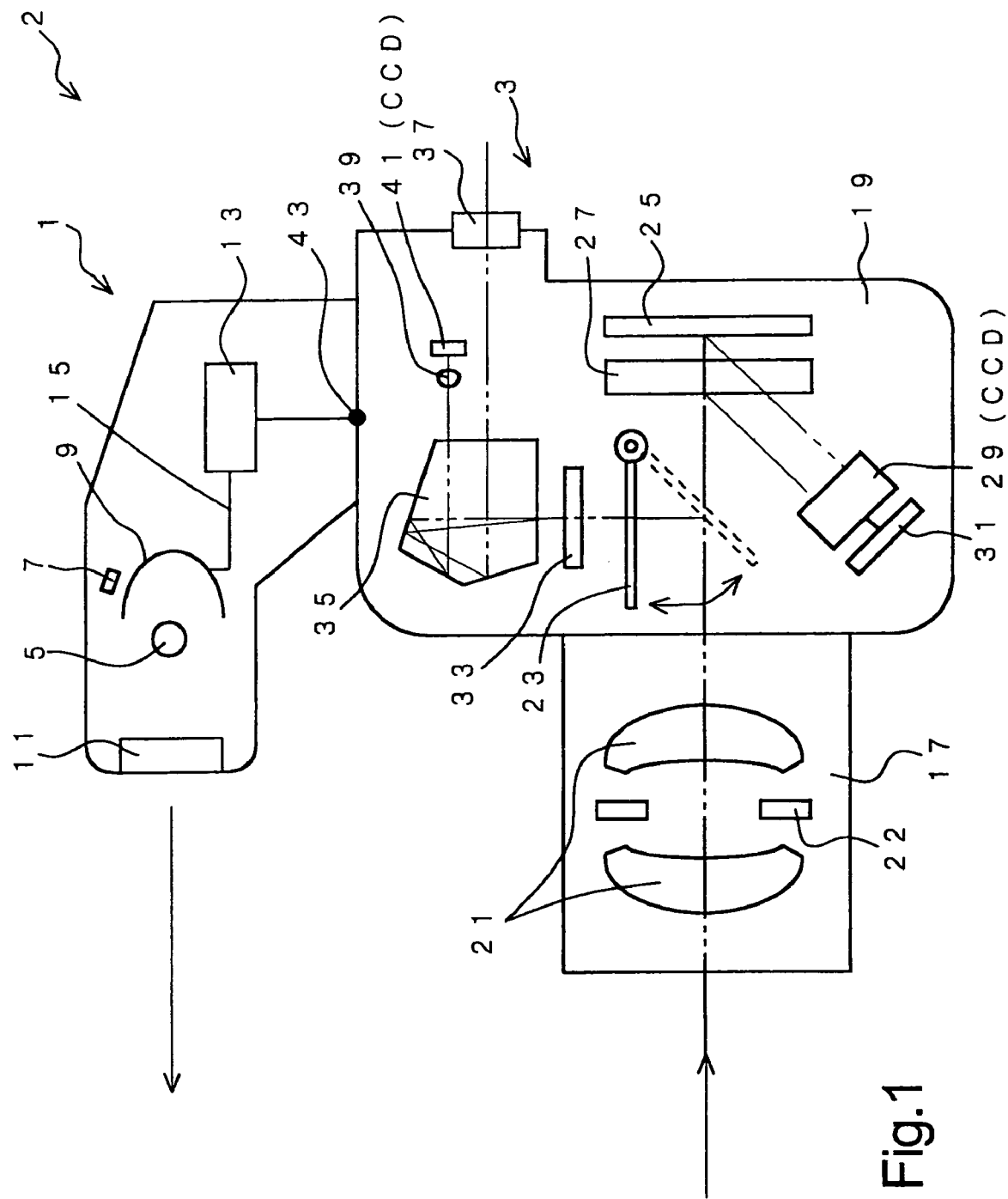
FIG. 1 is an explanatory diagram showing an electronic camera including an image-processing device according to a first embodiment of the present invention.

FIG. 1 is an explanatory diagram showing an electronic camera including an image-processing device according to a first embodiment of the present invention.

An electronic camera 2 includes: an external flash device 1 for illuminating a subject with light; and a camera body unit 3 capable of controlling the external flash device 1.

The external flash device 1 includes: a xenon tube 5 for converting a current energy into a luminous energy; a light-emission controlling unit 7 for controlling a photocurrent in the xenon tube 5 to cause flat light emission. The external flash device 1 also includes a reflector 9 and a Fresnel lens 11 for efficiently radiating a light beam emitted from the xenon tube 5 onto the subject. The external flash device 1 further includes: a sensor 13 for monitoring; and a glass fiber 15 for connecting the sensor 13 and the reflector 9 with each other so as to direct the light beam emitted from the xenon tube 5 to the sensor 13.

The camera body unit 3 includes: a photo-taking lens unit 17; and a body unit 19 to which the photo-taking lens unit 17 is attached.

The photo-taking lens unit 17 includes a photo-taking lens 21 for collecting the light beam from the subject and a diaphragm 22.

The body unit 19 includes a half mirror 23 which pivots between a position where the half mirror 23 can receive the light beam transmitted through the photo-taking lens 21 (hereinafter, referred to as a closed state) and a position where the half mirror 23 cannot receive the light beam (hereinafter, referred to as an opened state). A film 25 made of silver halide salt is attached to the main body unit 19. The film 25 can receive the light beam transmitted through the photo-taking lens 21 among light emitted from the external flash device 1 and then reflected by the subject. The body unit 19 includes a shutter 27 for selectively shielding light in front of the film 25.

The body unit 19 also includes: a CCD 29 serving as a first image sensor provided so as to be capable of receiving the light beam reflected by the shutter 27 or the film 25 among the light beams transmitted through the photo-taking lens 21; and an electric circuit 31 for controlling the external flash device 1 based on the photometric results of the CCD 29.

The body unit 19 further includes a focusing glass 33 provided at an imaging position of the photo-taking lens 21 through the half mirror 23 when the half mirror 23 is in a closed state. The body unit 19 also includes: a displaceable penta prism 35 for changing a light path of the light beam transmitted through the focusing glass 33; and a finder 37 to observe the light beam from the penta prism 35. The body unit 19 further includes: a collective lens 39 for collecting the light transmitted through the penta prism 35 when the penta prism 35 is situated at a different position from an incident position of the light reflected from the penta prism 35 on the finder 37; and a CCD 41 serving as a second image sensor for receiving the light transmitted through the collective lens 39. The CCD 41 is used as a calorimetric sensor.

A contact 43 is provided as an interface between the external flash device 1 and the camera body unit 3.

Next, an optical system of the electronic camera 2 having the above-described structure will be described.

When the subject is to be observed through the finder 37, a part of the light beam transmitted through the photo-taking lens 21 is reflected by the half mirror 23 in the closed state indicated with a broken line. Then, the reflected light beam transmits through the focusing glass 33 and the penta prism 35 so as to be directed to the finder 37.

When a release button (not shown) is pressed down for photographing, the half mirror 23 is moved to a position of the opened state indicated with a solid line so as to lower the aperture of the diaphragm 22 and to open the shutter 27. Nearly simultaneously, the xenon tube 5 makes a real flash to illuminate the subject. The light reflected from the subject reaches the film 25 through the photo-taking lens 21. The light beam reflected by the film 25 enters the CCD 29.

Figure 2:
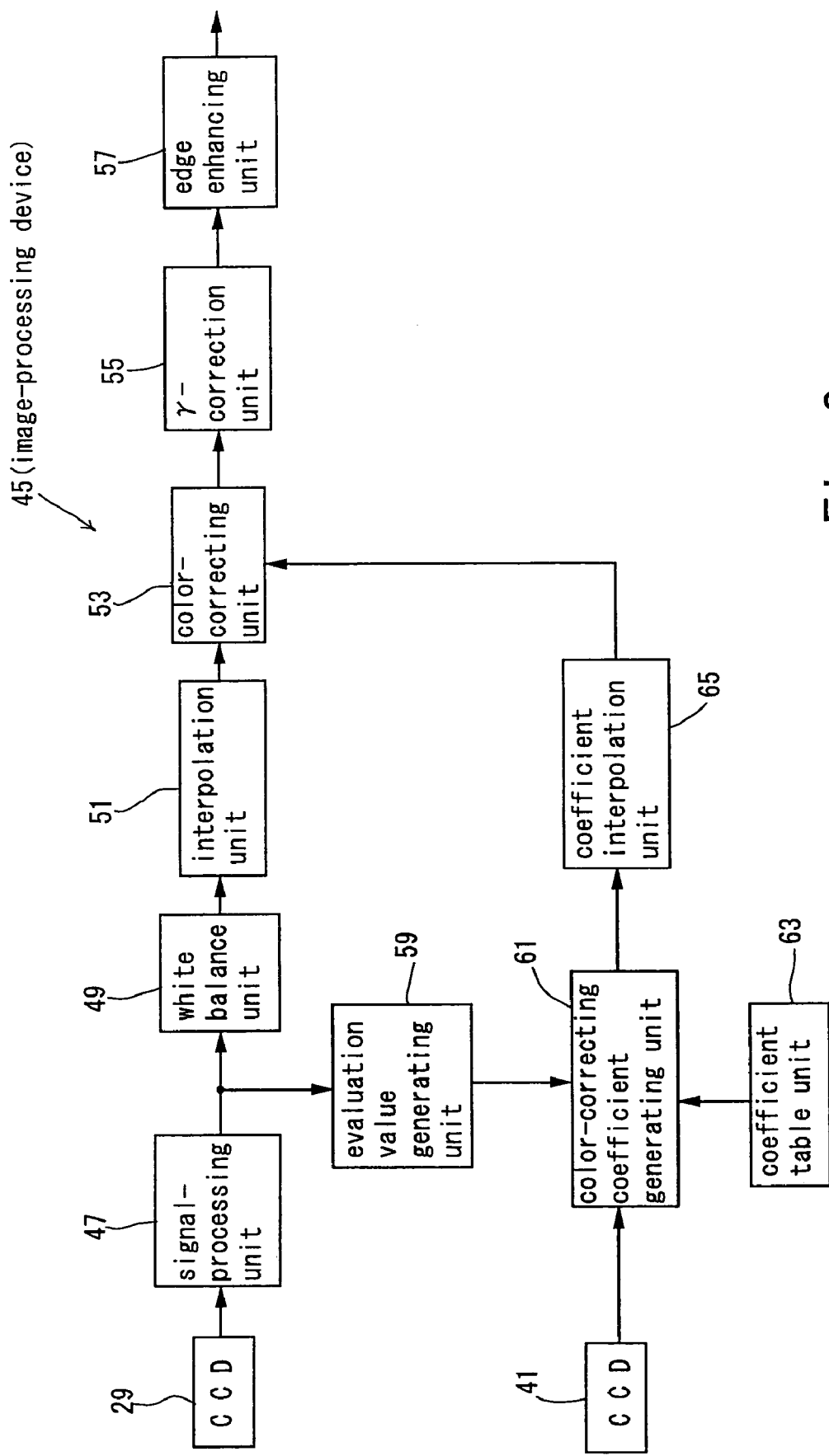
FIG. 2 is a block diagram showing a process of the image-processing device according to the first embodiment of the present invention.

Next, FIG. 2 is a block diagram showing the image-processing device according to the first embodiment of the present invention.

Figure 3:
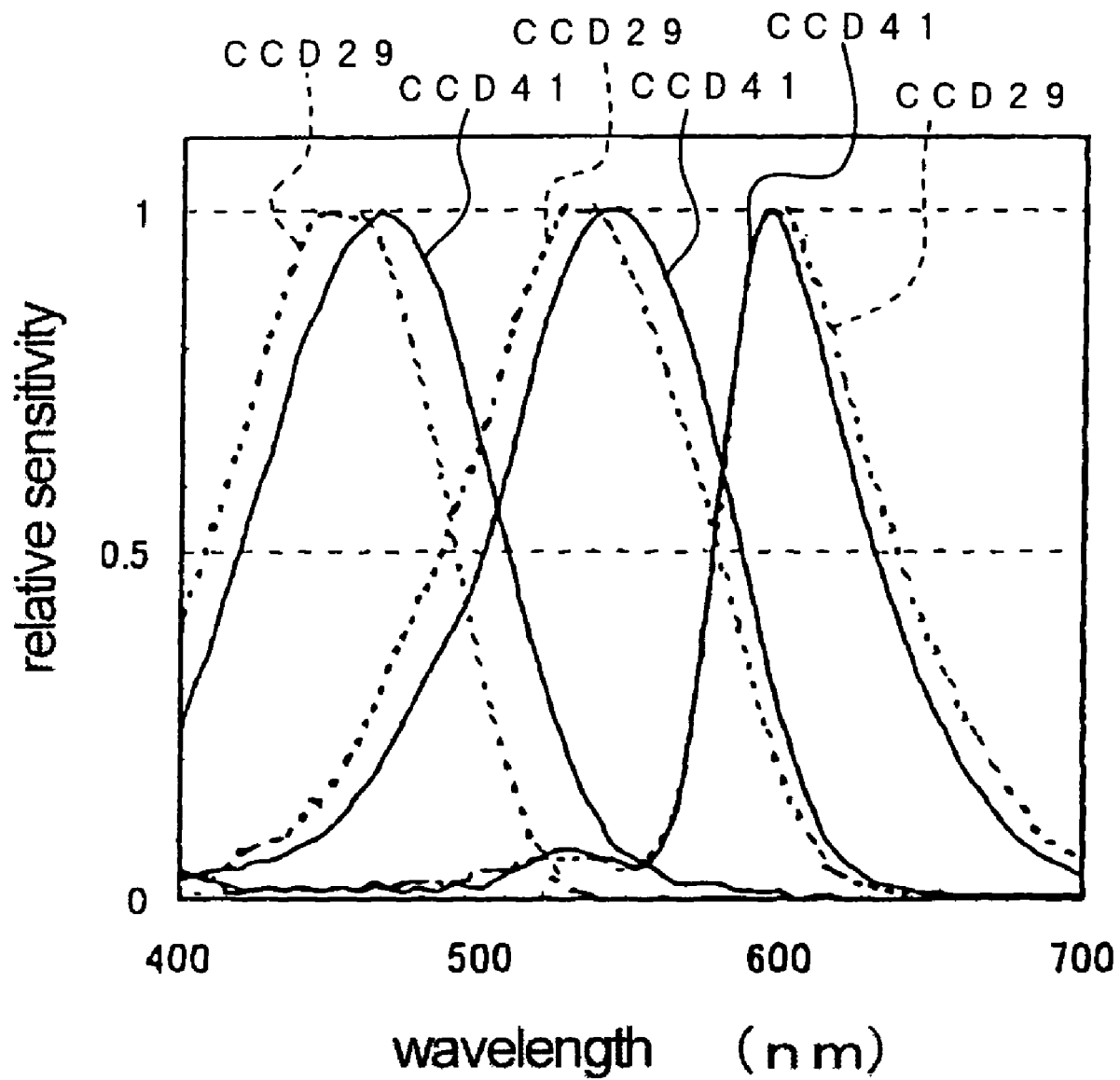
FIG. 3 is an explanatory diagram showing spectral sensitivity characteristics of CCDs of the image-processing device according to the first embodiment of the present invention.

An image-processing device 45 includes: the CCD 29 for receiving the light from the subject; and the CCD 41 capable of receiving the light of the same image as the CCD 29 and having a spectral sensitivity characteristic different from that of the CCD 29. The CCD 29 and the CCD 41 have different spectral sensitivity characteristics from each other as shown in FIG. 3. Their spectral sensitivity characteristics are made closer to that of the human eye by increasing parameters. Moreover, color filters of R, G, and B having the same light transmittance are provided for the CCD 29 and the CCD 41.

An output of the CCD 29 is subjected to A/D conversion or correction of a variation in power source voltage caused by a change in temperature and the like, in a signal-processing unit 47. Then, an output of the signal-processing unit 47 is input to a white balance unit 49 and an evaluation value generating unit 59.

In the white balance unit 49, image signals are multiplied respectively by white balance gains Kr and Kb so as to prevent any change from occurring in an output image due to a difference in color characteristics of a light source for illuminating the subject. More specifically, the following process is performed:

$$R' = Kr \times R$$

$$G' = G$$

$$B' = Kb \times B.$$

R, G, B: image signals before white balance correction
R', G', B': image signals after white balance correction An output of the white balance unit 49 is input to an interpolation unit 51. In the interpolation unit 51, a color interpolation process is performed by a pixel local operation so as to perform correction on all the pixels. More specifically, a color of an arbitrary pixel is estimated from the pixels in the vicinity of the arbitrary pixel.

On the other hand, in the evaluation value generating unit 59, an image is divided into small areas, for example, in 8 rows and 12 columns. Then, evaluation values such as a luminance value or a chromaticity value are calculated for each of the small areas. The luminance is in proportion to absolute luminosity of a color of an object. The chromaticity corresponds to an objectively measured color of the object, which excludes the luminance information.

In this first embodiment, in a color-correcting coefficient generating unit 61 corresponding to a color-correcting coefficient determining part, a color-correcting coefficient is calculated based on the outputs of the CCD 41 and the evaluation value generating unit 59.

Figure 4:
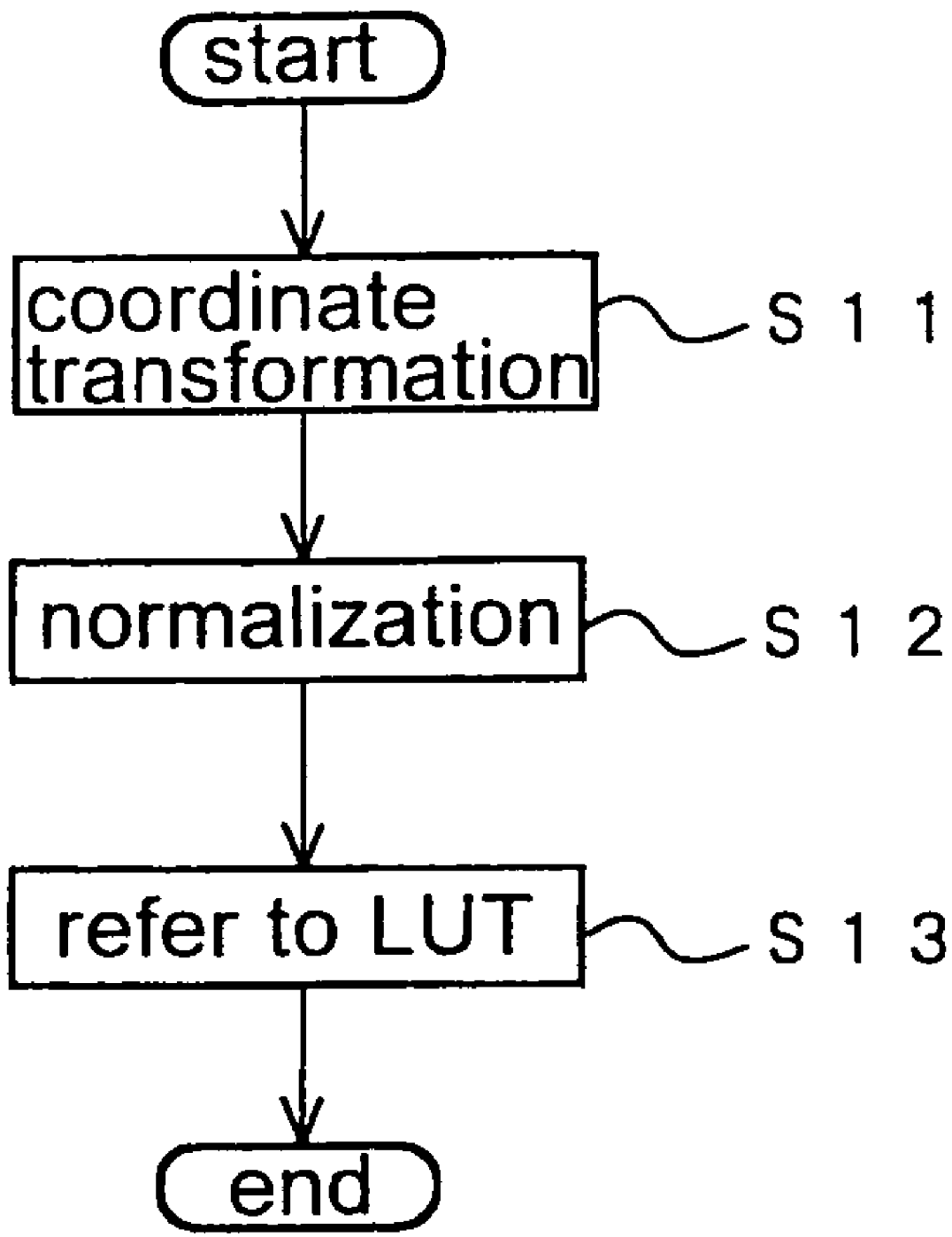
FIG. 4 is a flowchart showing a process in a color-correcting coefficient generating unit shown in FIG. 2.

Hereinafter, a method of calculating the color-correcting coefficient will be specifically described with reference to a flowchart in FIG. 4.

At step S11, coordinate transformation for making the coordinate dimensionless is performed.

More specifically, integrated values of output values from each of the small areas of the image from the CCD 29 for the respective primary colors are referred to as Rs, Gs, and Bs, respectively. In a similar manner, the CCD 41 is also divided into small areas, for example, in 8 rows and 12 columns. Integrated values for each of the small areas for the respective colors are referred to as Rm, Gm, and Bm, respectively. Then, an operation as follows is performed:

$$RGs = Rs/Gs$$

$$BGs = Bs/Gs$$

$$RGm = Rm/Gm$$

$$BGm = Bm/Gm.$$

RGs, BGs, RGm, BGm: first false color-correcting coefficients

At step S12, normalization is performed using the first false color-correcting coefficients RGs, BGs, RGm, and BGm and coefficients in a coefficient table unit 63. Specifically, an operation as follows is performed:

$$RGs' = RGs \times k1 + k2$$

$$BGs' = BGs \times k1 + k2$$

$$RGm' = RGm \times k3 + k4$$

$$BGm' = BGm \times k3 + k4.$$

k1, k2, k3, k4: coefficients
RGs', BGs', RGm', BGm': second false color-correcting coefficients At step S13, color-correcting coefficients are calculated with reference to an LUT based on the second false color-correcting coefficients RGs', BGs', RGm', and BGm'.

More specifically, a coefficient number is obtained with reference to the LUT shown in FIG. 5 based on the second false color-correcting coefficients RGs', BGs', RGm', and BGm'.

Subsequently, color-correcting coefficients CC0 to CC8 corresponding to the coefficient number selected from FIG. 5 are selected with reference to a table shown in FIG. 6. In the above-described manner, the calculation of the color-correcting coefficients is terminated.

The coefficient numbers are listed in a longitudinal direction of the table shown in FIG. 5, whereas the second false color-correcting coefficients RGs', BGs', RGm', and BGm' are listed in a horizontal direction.

The coefficient numbers are listed in a longitudinal direction of the table shown in FIG. 6, whereas the color-correcting coefficients CC0 to CC8 are listed in a horizontal direction.

In a coefficient interpolation unit 65, coefficient interpolation is performed so as to reduce a step generated by a difference in the color-correcting coefficients CC0 to CC8 calculated by the color-correcting coefficient generating unit 61 at the respective boundaries between the small areas. The coefficient interpolation is performed by linear interpolation using the coefficients of the small areas in the vicinity. Color-correcting coefficients after the coefficient interpolation are hereinafter referred to as CC'0 to CC'8.

In a color-correcting unit 53 corresponding to a color-correcting part, a color-correcting operation as follows is performed by using image signals R", G", and B" output from the interpolation unit 51 and the color-correcting coefficients CC'0 to CC'8 calculated in the coefficient interpolation unit 65.

$$R''' = R'' \times CC'0 + G'' \times CC'1 + B'' \times CC'2$$

$$G''' = R'' \times CC'3 + G'' \times CC'4 + B'' \times CC'5$$

$$B''' = R'' \times CC'6 + G'' \times CC'7 + B'' \times CC'8$$

In a γ-correction unit 55, a γ-characteristic is corrected. The γ-characteristic is appropriately selected in accordance with contrast of the subject. More specifically, the γ-characteristic is calculated based on the luminance value calculated in the evaluation value generating unit 59.

In an edge enhancing unit 57, a process for enhancing an edge of the image is performed.

In the first embodiment, the CCDs 29 and 41 each having a different spectral sensitivity characteristic are provided so as to increase the parameters when the CCDs 29 and 41 receive and recognize light from a subject field. Therefore, the spectral sensitivity characteristic can be made closer to that of the human eye so as to obtain a favorable color reproduction characteristic. Furthermore, in the case where the first embodiment of the present invention is applied to a conventional electronic camera having the CCDS 29 and 41, a change in the signal-processing method is only required. Accordingly, the first embodiment can be easily applied to an existing electronic camera.

Moreover, in the first embodiment, the CCD 29 and the CCD 41 use a different number of pixels to receive the light from the same subject. Since the observation of the subject is achieved with the two CCDs 29 and 41, the image can be prevented from being coarse even when the number of pixels used by any one of the CCDs 29 and 41 is reduced. Therefore, the amount of time required for the image processing can be reduced.

Furthermore, in the first embodiment, the CCD 29 is divided into the plurality of small areas. Then, the CCD 41 is also divided into the plurality of small areas so as to correspond to the small areas of the CCD 29. An output value of each of the pixels of the CCD 29 and the CCD 41 is integrated for each of the small areas so that the integrated values are used to calculate the color-correcting coefficients. Accordingly, as compared with the case where the color-correcting coefficients are calculated for each pixel, it is ensured that the amount of time required for the image processing can be reduced.

Second Embodiment

Figure 7:
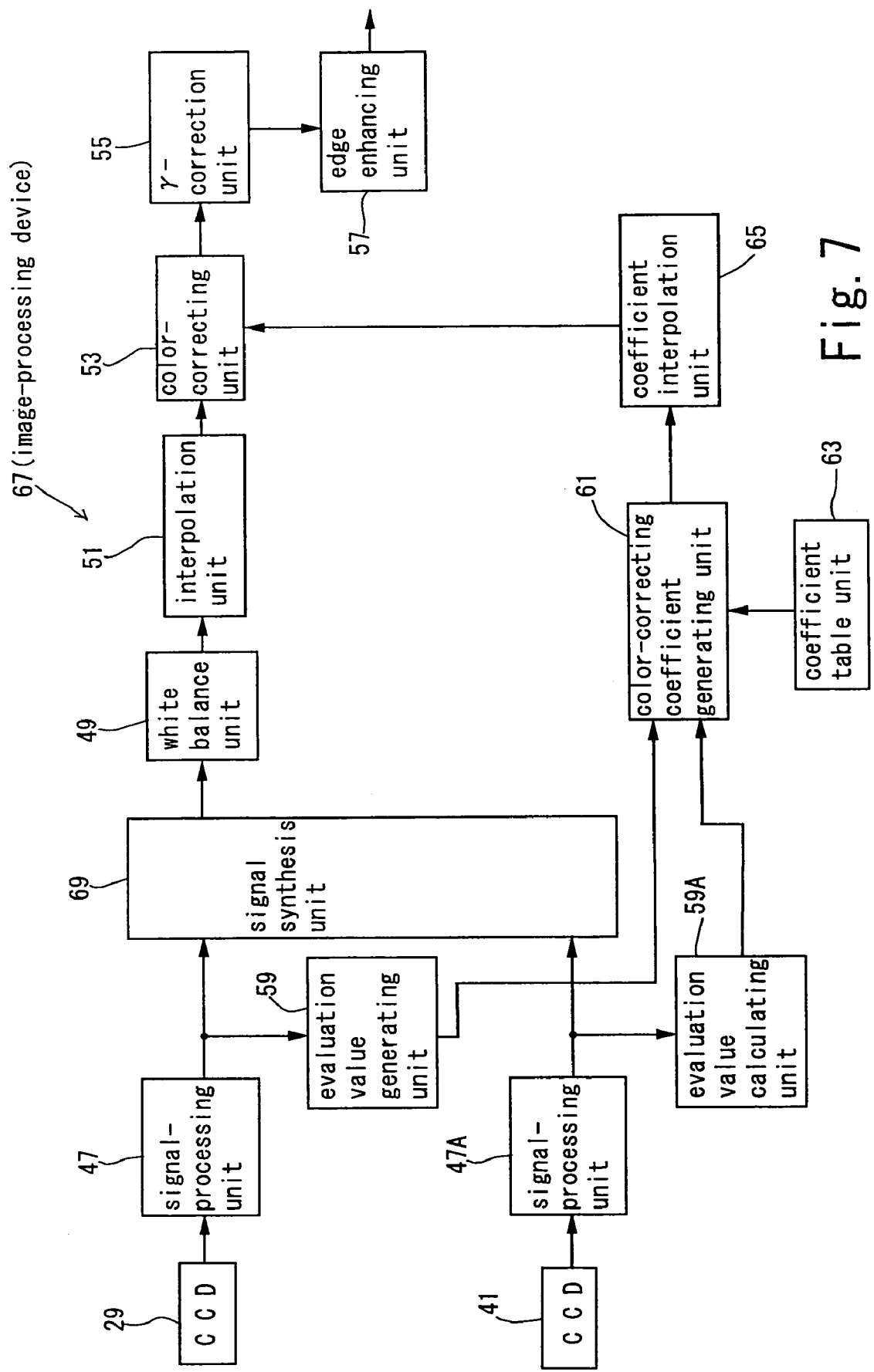
FIG. 7 is a block diagram showing a process of the image-processing device according to a second embodiment of the present invention.

FIG. 7 is a block diagram showing an image-processing device according to a second embodiment of the present invention. The second embodiment differs from the first embodiment only in the signal-processing method.

The same parts as those of the first embodiment will be designated by identical reference numbers in the second embodiment, and detailed description thereof will be omitted.

An image-processing device 67 includes the CCDs 29 and 41, each having color filters of R, G, and B for receiving light from a subject.

The outputs of the CCDs 29 and 41 are subjected to A/D conversion or correction of a variation in power source voltage caused by a change in temperature and the like, in the signal-processing units 47 and 47A, respectively. Then, outputs of the signal-processing units 47 and 47A are input to a signal synthesis unit 69 and the evaluation value generating units 59 and 59A, respectively.

In the signal synthesis unit 69, two signals are synthesized to generate a signal of an image closer to that perceived by the human eye. Subsequently, an output of the signal synthesis unit 69 is input through the white balance unit 49 and the interpolation unit 51 to the color-correcting unit 53.

On the other hand, in each of the evaluation value generating units 59 and 59A, an image is divided into small areas, for example, in 8 rows and 12 columns. Then, an evaluation value such as a luminance value or a chromaticity value is calculated for each of the small areas.

In the color-correcting coefficient generating unit 61, a color-correcting coefficient is calculated based on the outputs of the evaluation value generating units 59 and 59A and the coefficient table unit 63.

In the coefficient interpolation unit 65, coefficient interpolation is performed so as to reduce a step at the respective boundaries between the small areas due to a difference in the color-correcting coefficients CC0 to CC8 calculated by the color-correcting coefficient generating unit 61. Then, the color-correcting coefficients CC'0 to CC'8 are calculated.

In the color-correcting unit 53, a color-correcting operation is performed by using image signals output from the interpolation unit 51 and the color-correcting coefficients CC'0 to CC'8 calculated in the coefficient interpolation unit 65. Subsequently, an output of the color-correcting unit 53 is sequentially transmitted to the γ-correction unit 55 and the edge enhancing unit 57.

The image-processing device 67 can also achieve the same effects as those of the first embodiment.

In the image-processing device of the second embodiment as described above, a synthesized output value of the CCD 29 and the CCD 41 each having a different spectral sensitivity characteristic is subjected to color conversion in the color-correcting unit 53. Therefore, it is possible to multiply a signal of an image closer to that perceived by the human eye by the color-correcting coefficient as compared with the case where the output signal of one of the CCDs, i.e., the CCD 29, is multiplied by the color-correcting coefficient as in the first embodiment.

Third Embodiment

Figure 8:
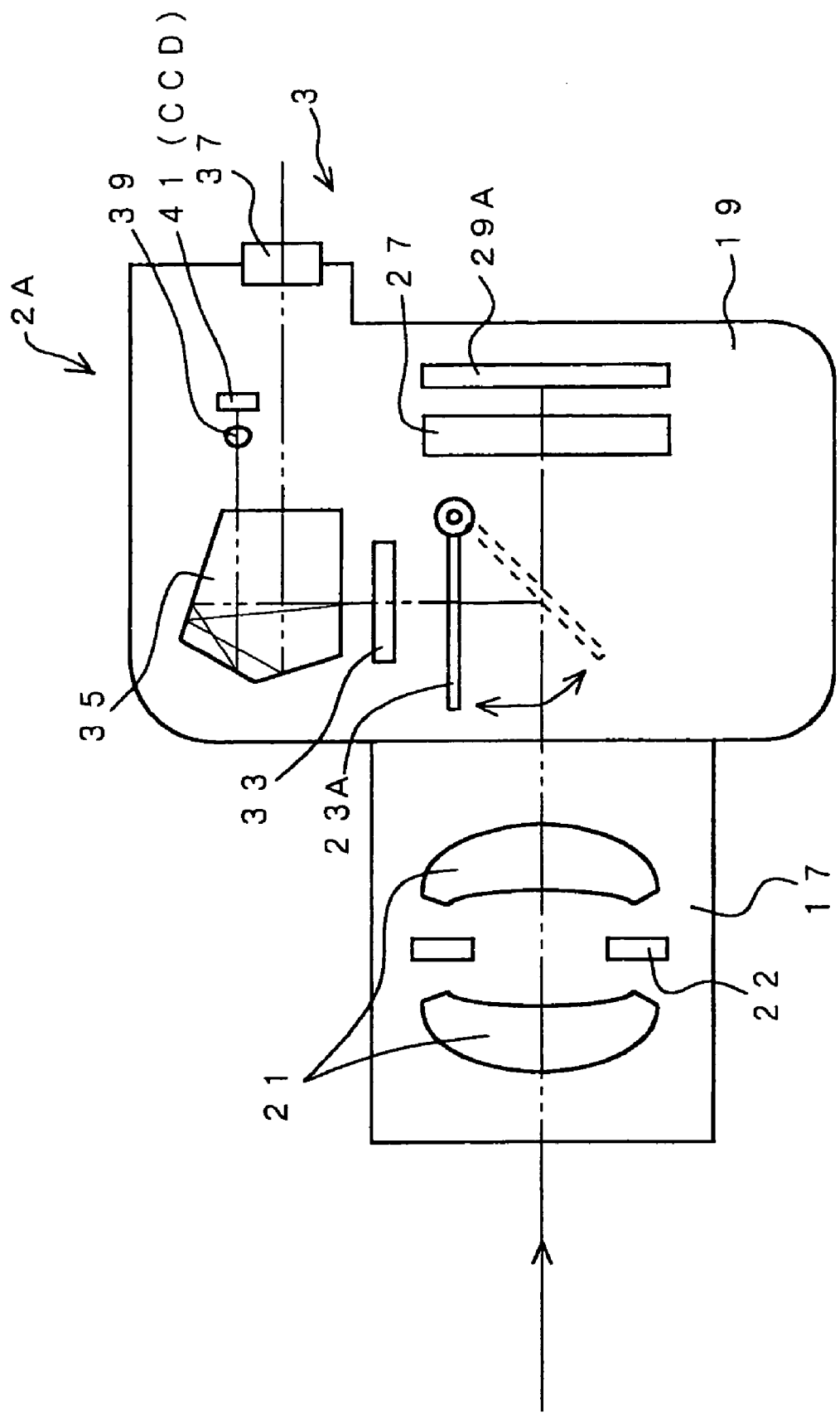
FIG. 8 is an explanatory diagram showing an electronic camera including the image-processing device according to a third embodiment of the present invention.

FIG. 8 is an explanatory view showing an electronic camera including an image-processing device according to a third embodiment of the present invention.

The same parts as those of the first embodiment will be designated by identical reference numbers in the third embodiment, and detailed description thereof will be omitted.

An electronic camera 2A includes the photo-taking lens unit 17 and the body unit 19 to which the photo-taking lens unit 17 is attached.

The photo-taking lens unit 17 includes the photo-taking lens 21 for collecting the light beam from the subject and the diaphragm 22.

The body unit 19 includes a mirror 23A which pivots between a position where the mirror 23A can receive the light beam transmitted through the photo-taking lens 21 (hereinafter, referred to as a closed state) and a position where the mirror 23A cannot receive the light beam (hereinafter, referred to as an opened state).

The body unit 19 also includes a CCD 29A serving as a first image sensor capable of receiving the light beam transmitted through the photo-taking lens 21. The CCD 29A captures an image of the subject. The shutter 27 is provided in front of the CCD 29A.

The body unit 19 further includes the focusing glass 33 provided at an imaging position of the photo-taking lens 21 through the mirror 23A when the mirror 23A is in a closed state. The body unit 19 also includes: the penta prism 35 for changing a light path of the light beam transmitted through the focusing glass 33; and the finder 37 serving to observe the light beam from the penta prism 35.

The body unit 19 further includes: the collective lens 39 for collecting the light transmitted through the penta prism 35; and the CCD 41 serving as a second image sensor for receiving the light transmitted through the collective lens 39. The CCD 41 is used as a colorimetric sensor. The exposure is controlled by a colorimetric signal from the CCD 41.

An optical system of the electronic camera 2A having the above-described structure will now be described.

When the subject is to be observed through the finder 37, a part of the light beam transmitted through the photo-taking lens 21 is reflected by the mirror 23A in the closed state indicated with a broken line in FIG. 8. Then, the reflected light beam transmits through the focusing glass 33 and the penta prism 35 so as to be directed to the finder 37.

When a release button (not shown) is pressed down for photographing, the mirror 23A is moved to a position of the opened state indicated with a solid line so as to lower the aperture of the diaphragm 22 and to open the shutter 27. The light from the subject transmitted through the photo-taking lens 21 forms an image on the CCD 29A so as to perform image capture.

Figure 9:
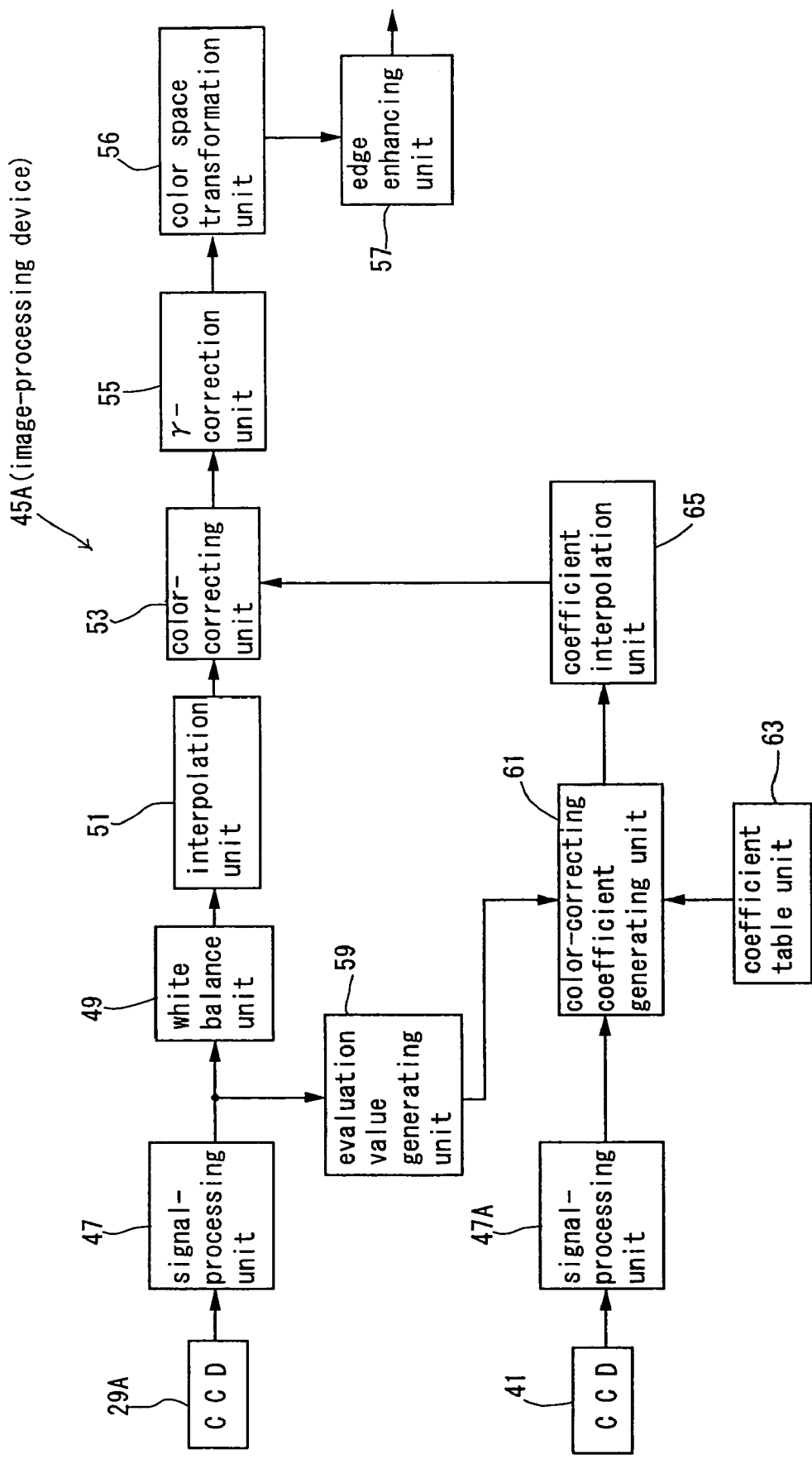
FIG. 9 is a block diagram showing a process of the image-processing device according to the third embodiment of the present invention.

Next, FIG. 9 is a block diagram showing an image-processing device according to the third embodiment of the present invention.

Figure 10:
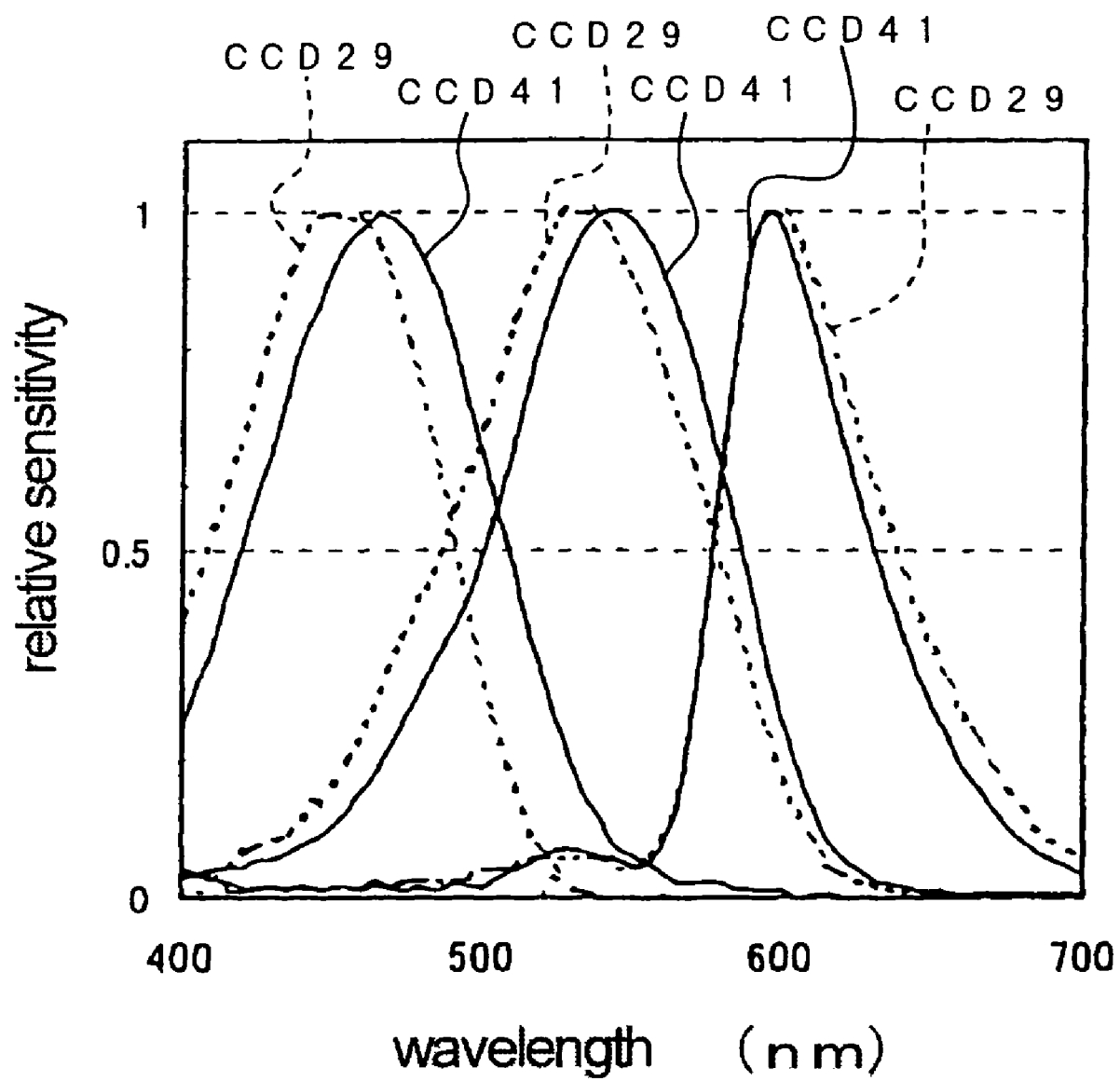
FIG. 10 is an explanatory diagram showing spectral sensitivity characteristics of CCDs of the image-processing device according to the third embodiment of the present invention.

An image-processing device 45A includes: the CCD 29A for receiving the light from the subject; and the CCD 41 capable of receiving the light of the same image as the CCD 29 and having a spectral sensitivity characteristic different from that of the CCD 29A. The CCD 29A and the CCD 41 have different spectral sensitivity characteristics from each other as shown in FIG. 10. Color filters of R, G, and B having the same light transmittance are provided for the CCD 29A and the CCD 41.

An output of the CCD 29A is output to the signal-processing unit 47 where the output is subjected to A/D conversion, clamping, sensitivity correction, and the like. Subsequently, an output of the signal-processing unit 47 is input to the white balance unit 49 and the evaluation value generating unit 59.

In the white balance unit 49, image signals are multiplied respectively by white balance gains. Kr and Kb so as to prevent any change from occurring in an output image due to a difference in color characteristics of a light source for illuminating the subject.

More specifically, the following process is performed:

$$R'=Kr \times R$$

$$G'=G$$

$$B'=Kb \times B.$$

R, G, B: image signals before white balance correction
R', G', B': image signals after white balance correction An output of the white balance unit 49 is input to the interpolation unit 51. In the interpolation unit 51, a color interpolation process is performed by a pixel local operation so as to perform correction on all the pixels. More specifically, a color of an arbitrary pixel is estimated from the pixels in the vicinity of the arbitrary pixel.

On the other hand, in the evaluation value generating unit 59, an image is divided into small areas, for example, in 8 rows and 12 columns. Then, an evaluation value such as a luminance value or a chromaticity value is calculated for each of the small areas. The luminance is in proportion to absolute luminosity of a color of an object. The chromaticity corresponds to an objectively measured color of the object, which excludes the luminance information.

In this third embodiment, in the color-correcting coefficient generating unit 61 corresponding to a color-correcting coefficient determining part, a color-correcting coefficient is calculated based on the outputs of the CCD 41 and the evaluation value generating unit 59. After being subjected to A/D conversion, clamping, sensitivity correction, and the like in the signal-processing unit 47A, the output of the CCD 41 is output to the color-correcting coefficient generating unit 61.

Figure 11:
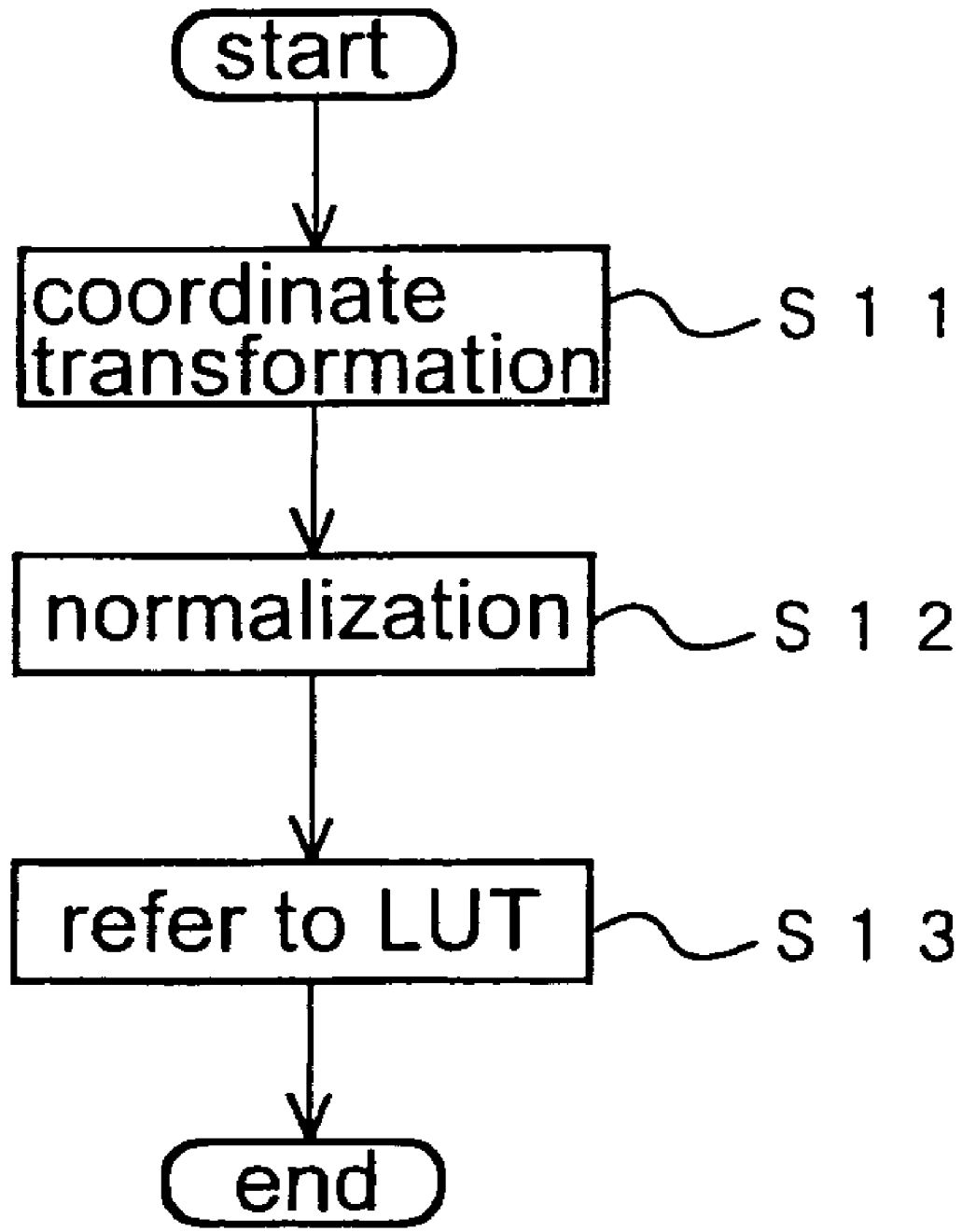
FIG. 11 is a flowchart showing a process in a color-correcting coefficient generating unit shown in FIG. 9.

Hereinafter, a method of calculating the color-correcting coefficient will be specifically described with reference to a flowchart in FIG. 11.

At step S11, coordinate transformation for making the coordinate dimensionless is performed.

More specifically, integrated values of the respective primary colors of an output value from each of the small areas of the image from the CCD 29A are referred to as Rs, Gs, and Bs, respectively. In a similar manner, the CCD 41 is divided into small areas, for example, in 8 rows and 12 columns, and integrated values of the respective primary colors for each of the small areas are referred to as Rm, Gm, and Bm, respectively. Then, an operation as follows is performed:

$$RGs = Rs/Gs$$

$$BGs = Bs/Gs$$

$$RGm = Rm/Gm$$

$$BGm = Bm/Gm.$$

RGs, BGs, RGm, BGm: first false color-correcting coefficients

At step S12, normalization is performed using the first false color-correcting coefficients RGs, BGs, RGm, and BGm and coefficients in the coefficient table unit 63. Specifically, an operation as follows is performed:

$$RGs' = RGs \times k1 + k2$$

$$BGs' = BGs \times k1 + k2$$

$$RGm' = RGm \times k3 + k4$$

$$BGm' = BGm \times k3 + k4.$$

k1, k2, k3, k4: coefficients
RGs', BGs', RGm', BGm': second false color-correcting coefficients At step S13, a color-correcting coefficient is calculated with reference to the LUT based on the second false color-correcting coefficients RGs', BGs', RGm', and BGm'.

More specifically, a coefficient number is obtained with reference to the LUT shown in FIG. 5 based on the second false color-correcting coefficients RGs', BGs', RGm', and BGm'. Subsequently, color-correcting coefficients CC0 to CC8 corresponding to the coefficient number selected from FIG. 5 are selected with reference to a table shown in FIG. 6.

In the above-described manner, the calculation of the color-correcting coefficients is terminated.

In the coefficient interpolation unit 65, coefficient interpolation is performed so as to reduce a step at the respective boundaries between the small areas due to a difference in the color-correcting coefficients CC0 to CC8 calculated by the color-correcting coefficient generating unit 61. The coefficient interpolation is performed by linear interpolation using the coefficients of the small areas in the vicinity. Color-correcting coefficients after the coefficient interpolation are hereinafter referred to as CC'0 to CC'8.

In the color-correcting unit 53 corresponding to a color-correcting part, a color-correcting operation as follows is performed by using image signals R'', G'', and B'' output from the interpolation unit 51 and the color-correcting coefficients CC'0 to CC'8 calculated in the coefficient interpolation unit 65.

$$R''' = R'' \times CC'0 + G'' \times CC'1 + B'' \times CC'2$$

$$G''' = R'' \times CC'3 + G'' \times CC'4 + B'' \times CC'5$$

$$B''' = R'' \times CC'6 + G'' \times CC'7 + B'' \times CC'8$$

Subsequently, image signals R''', G''', and B''', which are subjected to color correction in the color-correcting unit 53, sequentially undergo processes in the γ-correction unit 55, a color space transformation unit 56, and the edge enhancing unit 57 so as to be recorded onto a recording medium.

In the third embodiment, the CCDs 29A and 41 each having a different spectral sensitivity characteristic are provided so as to increase the parameters when the CCDs 29A and 41 receive and recognize light from a subject field. Therefore, the spectral sensitivity characteristic can be made closer to that of the human eye so as to obtain a favorable color reproduction characteristic. Furthermore, in the case where the third embodiment of the present invention is applied to a conventional electronic camera including the CCDs 29A and 41, a change in the signal-processing method is only required. Accordingly, the third embodiment of the present invention can be easily applied to an existing electronic camera.

Furthermore, in the third embodiment, the CCD 29A is divided into the plurality of small areas. Then, the CCD 41 is also divided into the plurality of small areas so as to correspond to the small areas of the CCD 29A. An output value of each of the pixels of the CCD 29A and the CCD 41 is integrated for each of the small areas so that the color-correcting coefficients are calculated by using the integrated values. Accordingly, even when the CCDs 29A and 41 have a different number of pixels, it is ensured that a favorable color reproduction characteristic can be easily obtained.

In the above-described embodiments, the CCD 41 is used as a colorimetric sensor. However, the CCD 41 may also be used as a photometric sensor for measuring the luminance of a subject.

In the above-described embodiments, a functional operation using the coefficients k1 to k4 is performed for normalization in the color-correcting coefficient generating unit 61. However, a one-dimensional LUT or a multidimensional LUT may be used instead.

Furthermore, in the above-described embodiments, the color-correcting coefficients CC0 to CC8 are selected so as to perform a 3-by-3 matrix operation. However, in order to perform color correction with higher accuracy, a multidimensional LUT may be selected to perform an operation, for example.

The invention is not limited to the above embodiments and various modifications may be made without departing from the spirit and scope of the invention. Any improvement may be made in part or all of the components.

What is claimed is:

1. An image-processing device comprising:
   a first image sensor which receives light from a subject and outputs a first plurality of color components;
   a second image sensor, whose spectral sensitivity characteristic of a second plurality of color components differs from that of said first image sensor, which receives light of the same image as said first image sensor and is capable of outputting the second plurality of color components;
   a color-correcting coefficient determining part which calculates a color-correcting coefficient according to a status of light received from the subject, based on each output value obtained by photoelectrical conversion in said first image sensor and said second image sensor; and
   a color-correcting part which performs color correction on the output value of said first image sensor by using said color-correcting coefficient calculated by said color-correcting coefficient determining part.

2. The image-processing device according to claim 1, wherein:
   said first image sensor is divided into a plurality of small areas, and said second image sensor is divided into a plurality of small areas so as to correspond to the plurality of small areas of said first image sensor; and
   the output value of each pixel of said first image sensor and said second image sensor is integrated for each of said small areas so as to calculate said color-correcting coefficient by using the integrated value.

3. The image-processing device according to claim 2, wherein
   said first image sensor and said second image sensor use a different number of pixels to receive the light from the same subject.

4. The image-processing device according to claim 1, wherein
   said second image sensor is used as a colorimetric sensor which measures color balance of said subject.

5. The image-processing device according to claim 1, wherein
   said second image sensor is used as a photometric sensor which measures luminance of said subject.

6. An image-processing device comprising:
   a first image sensor which receives light from a subject and outputs a first plurality of color components;
   a second image sensor, whose spectral sensitivity characteristic of a second plurality of color components differs from that of said first image sensor, receives light of the same image as said first image sensor and is capable of outputting the second plurality of color components;
   a color-correcting coefficient determining part which calculates a color-correcting coefficient based on each output value obtained by photoelectrical conversion in said first image sensor and said second image sensor; and
   a color-correcting part which performs color correction on a synthesized output value of said first image sensor and said second image sensor by using said color-correcting coefficient calculated by said color-correcting coefficient determining part.

7. The image-processing device according to claim 6, wherein:
   said first image sensor is divided into a plurality of small areas, and said second image sensor is divided into a plurality of small areas so as to correspond to the plurality of small areas of said first image sensor; and
   the output value of each pixel of said first image sensor and said second image sensor is integrated for each of said small areas so as to calculate said color-correcting coefficient by using the integrated value.

8. The image-processing device according to claim 7, wherein
   said first image sensor and said second image sensor use a different number of pixels to receive the light from the same subject.

9. The image-processing device according to claim 6, wherein
   said second image sensor is used as a colorimetric sensor which measures color balance of said subject.

10. The image-processing device according to claim 6, wherein
    said second image sensor is used as a photometric sensor which measures luminance of said subject.

* * * * *